(12) United States Patent
Matsuoka

(10) Patent No.: US 11,745,577 B2
(45) Date of Patent: Sep. 5, 2023

(54) TORQUE CONVERTER

(71) Applicant: EXEDY Corporation, Neyagawa (JP)

(72) Inventor: Yoshihiro Matsuoka, Neyagawa (JP)

(73) Assignee: EXEDY Corporation, Neyagawa (JP)

( * ) Notice: Subject to any disclaimer, the term of this patent is extended or adjusted under 35 U.S.C. 154(b) by 235 days.

(21) Appl. No.: 17/215,440

(22) Filed: Mar. 29, 2021

(65) Prior Publication Data

US 2021/0331576 A1 Oct. 28, 2021

(30) Foreign Application Priority Data

Apr. 24, 2020 (JP) ................. 2020-077562

(51) Int. Cl.
| | |
|---|---|
| *B60K 6/40* | (2007.10) |
| *B60K 6/405* | (2007.10) |
| *F16H 45/02* | (2006.01) |
| *H02K 5/24* | (2006.01) |
| *H02K 7/00* | (2006.01) |
| *H02K 7/10* | (2006.01) |
| *H02K 21/22* | (2006.01) |
| *H02K 9/19* | (2006.01) |

(52) U.S. Cl.
CPC ............. *B60K 6/405* (2013.01); *F16H 45/02* (2013.01); *H02K 5/24* (2013.01); *H02K 7/006* (2013.01); *H02K 7/10* (2013.01); *H02K 9/19* (2013.01); *H02K 21/22* (2013.01); *B60Y 2200/92* (2013.01); *B60Y 2400/426* (2013.01); *B60Y 2400/60* (2013.01); *F16H 2045/0221* (2013.01)

(58) Field of Classification Search
CPC ........ F16H 45/02; H02K 7/006; B60K 6/405; B60K 6/40
See application file for complete search history.

(56) References Cited

U.S. PATENT DOCUMENTS

2019/0376589 A1* 12/2019 Samie ...................... H02K 9/19

FOREIGN PATENT DOCUMENTS

| JP | 2004-528800 A | 9/2004 | |
| WO | WO-2018012172 A1 * | 1/2018 | ............. F16H 41/24 |

* cited by examiner

*Primary Examiner* — Abiy Teka
(74) *Attorney, Agent, or Firm* — United IP Counselors, LLC

(57) ABSTRACT

A torque converter includes a torque converter body and a rotary electrical machine. The torque converter body includes a cover, an impeller, a turbine, and a first stator. The rotary electrical machine includes a rotor and a second stator. The rotary electrical machine is disposed inside the torque converter body.

15 Claims, 5 Drawing Sheets

TORQUE CONVERTER

CROSS-REFERENCE TO RELATED APPLICATIONS

This application claims priority to Japanese Patent Application No. 2020-077562, filed Apr. 24, 2020. The entire contents of that application are incorporated by reference herein in their entirety.

TECHNICAL FIELD

The present invention relates to a torque converter.

BACKGROUND ART

Japanese translation of PCT International Application Publication No. 2004-528800 proposes a drive system including a motor and a torque converter. The motor and the torque converter are disposed inside a casing. A rotor of the motor is attached to a cover of the torque converter, whereby the rotor and the cover are unitarily rotated. On the other hand, a stator of the motor is supported by the casing.

The drive system described above includes a cooling medium channel arrangement inside the casing. The motor is cooled by the cooling medium channel arrangement. Thus, the drive system described above is provided with, as a discrete element, the cooling medium channel arrangement for cooling the motor.

BRIEF SUMMARY

It is an object of the present invention to provide a torque converter that is capable of cooling a rotary electrical machine without being provided with a system exclusive for cooling the rotary electrical machine.

A torque converter according to an aspect of the present invention includes a torque converter body and a rotary electrical machine. The torque converter body includes a cover, an impeller, a turbine, and a first stator. The rotary electrical machine includes a rotor and a second stator. The rotary electrical machine is disposed inside the torque converter body.

According to this configuration, the rotary electrical machine is disposed inside the torque converter body. Hence, the rotary electrical machine can be cooled by hydraulic oil circulating inside the torque converter body. Because of this, the rotary electrical machine can be cooled without providing a system exclusive for cooling the rotary electrical machine.

Preferably, the first stator and the second stator are supported by a stationary shaft.

Preferably, the rotor and the second stator are disposed between the cover and the turbine.

Preferably, the torque converter further includes an output member. The output member outputs a torque transmitted thereto from the turbine and the rotor.

Preferably, the rotor is unitarily rotated with the output member.

Preferably, the torque converter further includes an elastic member. The elastic member elastically couples the output member and at least one of the rotor and the turbine.

Preferably, the torque converter further includes a clutch part. The clutch part is configured to allow and block transmission of the torque between the rotor and the output member.

Preferably, the turbine is non-rotatable relative to the output member or the rotor.

Preferably, the torque converter further includes a lock-up piston. The lock-up piston is disposed to be axially movable.

Preferably, the torque converter further includes a damper mechanism. The damper mechanism elastically connects the lock-up piston and the output member.

Preferably, the damper mechanism is disposed radially inside the rotary electrical machine.

Preferably, the rotor is disposed radially outside the second stator. It should be noted that the rotor can be disposed radially inside the second stator.

Preferably, the torque converter body contains a hydraulic oil in an interior thereof.

Preferably, the second stator is attached to the first stator. The second stator can be attached to the first stator through an attachment member or so forth.

Preferably, the torque converter further includes an input member. The input member transmits a torque outputted from a drive source to the impeller. The cover outputs the torque to a drive wheel. The turbine is fixed to the cover. The impeller is disposed axially between the cover and the turbine.

Overall, according to the present invention, a rotary electrical machine can be cooled without providing a system exclusive for cooling the rotary electrical machine.

DETAILED DESCRIPTION

A torque converter according to a preferred embodiment will be hereinafter explained with reference to drawings. It should be noted that in the following explanation, the term "axial direction" means an extending direction of a rotational axis of the torque converter. Besides, the term "radial direction" means a radial direction of an imaginary circle about the rotational axis of the torque converter. Moreover, the term "circumferential direction" means a circumferential direction of the imaginary circle about the rotational axis of the torque converter.

[Entire Configuration]

Figure 1:
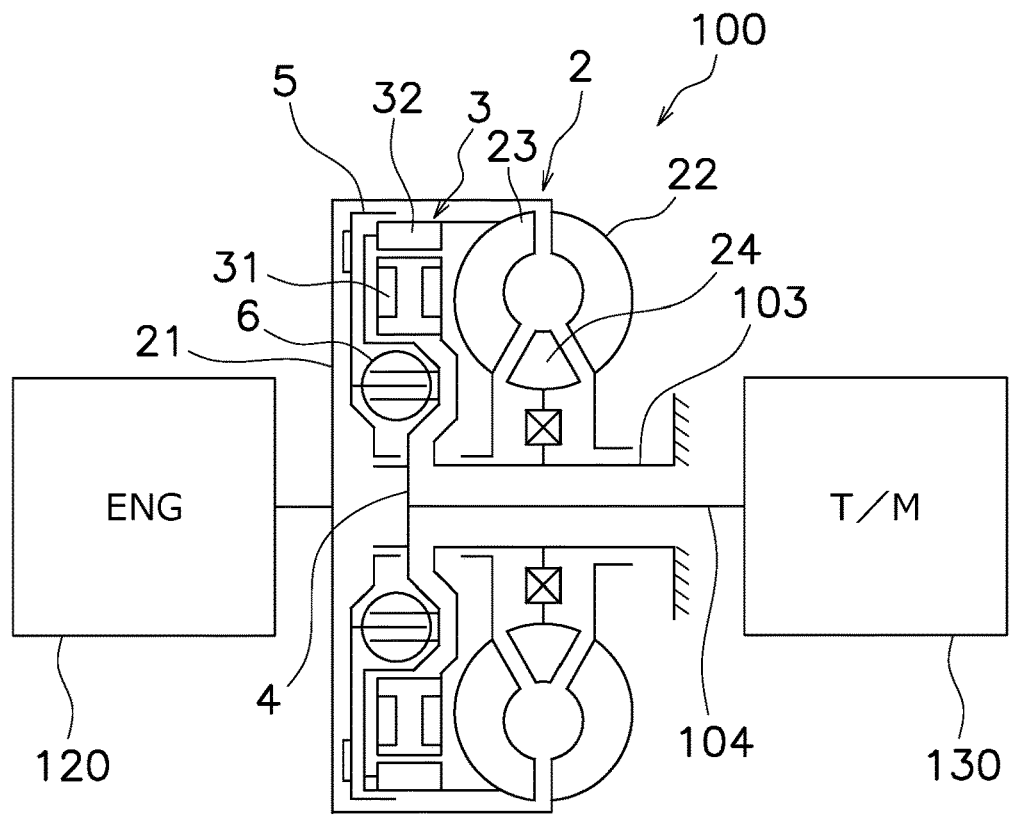
FIG. 1 is a schematic diagram of a torque converter.

As shown in FIG. 1, a torque converter 100 includes a torque converter body 2, a rotary electrical machine 3, an output member 4, a lock-up piston 5, and a damper mechanism 6. The torque converter 100 is rotated about a rotational axis O. The torque converter 100 is disposed in a torque transmission path from a drive source (e.g., engine) to a drive wheel or wheels (not shown in the drawings). Specifically, the torque converter 100 is a device, to which a torque is inputted from an engine 120, and from which the torque is outputted to a transmission 130. It should be noted that the engine 120 is disposed on the left side of the torque converter 100, whereas the transmission 130 is disposed on the right side of the torque converter 100.

[Torque Converter Body]

Figure 2:
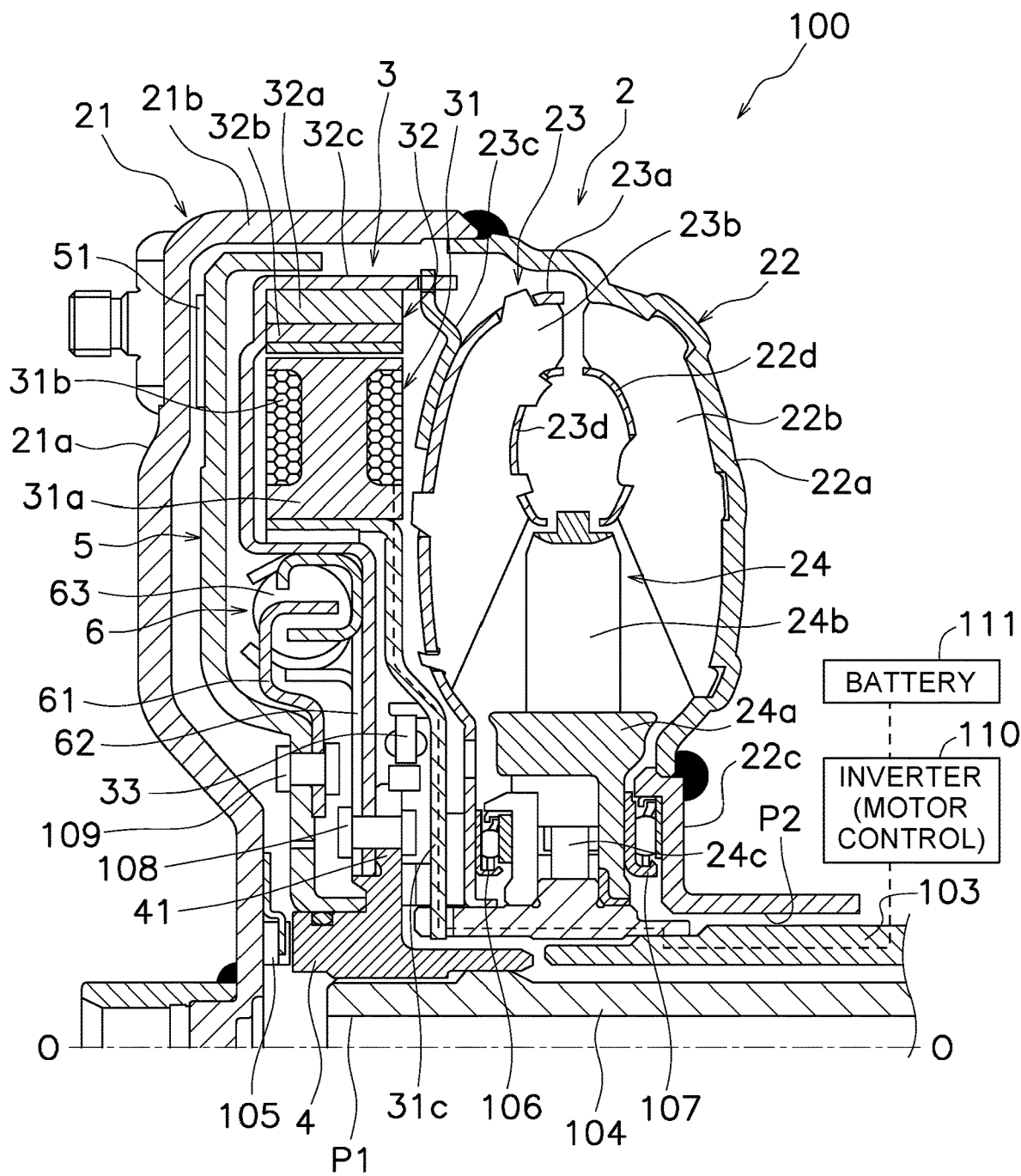
FIG. 2 is a cross-sectional view of the torque converter.

As shown in FIG. 2, the torque converter body 2 includes a cover 21, an impeller 22, a turbine 23, and a first stator 24. Hydraulic oil is contained in the interior of the torque converter body 2. When described in detail, the hydraulic oil is filled in a space between the cover 21 and the turbine 23 and a space between the impeller 22 and the turbine 23. The hydraulic oil is supplied to the interior of the torque converter body 2. The hydraulic oil circulates in the interior of the torque converter body 2.

The cover 21 includes a cover body 21a and a tubular portion 21b. The cover body 21a is a disc-shaped member. The tubular portion 21b extends axially toward the transmission 130 from the outer peripheral end of the cover body 21a.

The impeller 22 includes an impeller shell 22a, a plurality of impeller blades 22b, and an impeller hub 22c. The impeller shell 22a is welded to the tubular portion 21b of the cover 21. The impeller blades 22b are fixed to the inside of the impeller shell 22a. The impeller hub 22c is fixed to the inner peripheral end of the impeller shell 22a. The impeller hub 22c is disposed radially outside a stationary shaft 103. In other words, the stationary shaft 103 extends in the interior of the impeller hub 22c.

The turbine 23 is axially opposed to the impeller 22. The turbine 23 includes a turbine shell 23a and a plurality of turbine blades 23b. The turbine blades 23b are fixed to the impeller-side surface of the turbine shell 23a.

The first stator 24 is a mechanism for regulating the flow of the hydraulic oil returning from the turbine 23 to the impeller 22. The first stator 24 is disposed between the inner peripheral part of the impeller 22 and that of the turbine 23. The first stator 24 includes a stator shell 24a having an annular shape, a plurality of stator blades 24b, and a one-way clutch 24c. The first stator 24 is supported by the stationary shaft 103.

The stator blades 24b are provided on the outer peripheral surface of the stator shell 24a. The one-way clutch 24c is disposed between the stator shell 24a and the stationary shaft 103. In other words, the stator shell 24a is supported by the stationary shaft 103 through the one-way clutch 24c. The stationary shaft 103 has a tubular shape. The stationary shaft 103 extends between the outer peripheral surface of an input shaft 104 of the transmission 130 and the inner peripheral surface of the impeller hub 22c. The stationary shaft 103 is non-rotatable.

A thrust washer 105 is disposed between the inner peripheral end of the cover 21 and the output member 4. On the other hand, a thrust bearing 106 is disposed axially between the turbine 23 and the inner peripheral end of the first stator 24, whereas a thrust bearing 107 is disposed axially between the first stator 24 and the impeller 22.

[Rotary Electrical Machine]

The rotary electrical machine 3 is disposed inside the torque converter body 2. The rotary electrical machine 3 is disposed axially between the cover 21 and the turbine 23. When described in detail, the rotary electrical machine 3 is disposed axially between the lock-up piston 5 and the turbine 23. The rotary electrical machine 3 functions as a motor and as a generator. The rotary electrical machine 3 is rotated about the rotational axis O of the torque converter 100. In other words, the rotary electrical machine 3 includes a second stator 31 and a rotor 32.

The second stator 31 is disposed in a non-rotatable manner. The second stator 31 is supported by the stationary shaft 103. When described in detail, the second stator 31 is supported by the stationary shaft 103 through a stator support member 31c and the first stator 24. When described in more detail, the second stator 31 is attached to an inner race of the one-way clutch 24c of the first stator 24 through the stator support member 31c.

The second stator 31 has a substantially cylindrical shape. The second stator 31 includes a stator core 31a and a stator coil 31b.

The stator core 31a is formed by, for instance, axially laminating a plurality of electromagnetic steel plates. The stator core 31a includes a plurality of teeth disposed at intervals in the circumferential direction.

The stator coil 31b is wound about the stator core 31a. When described in detail, the stator coil 31b is wound about each of the teeth. As seen in an axial view, the stator core 31a and the stator coil 31b overlap an impeller core 22d and a turbine core 23d.

The stator support member 31c supports the second stator 31. When described in detail, the stator support member 31c supports the stator core 31a. The stator support member 31c has a disc shape. The stator support member 31c radially extends along the turbine shell 23a. The second stator 31 is attached to the outer peripheral end of the stator support member 31c.

The stator support member 31c is attached at the inner peripheral end thereof to the stationary shaft 103. When described in detail, the stator support member 31c is attached to the stationary shaft 103 through the first stator 24. When described in more detail, the stator support member 31c is attached to the inner race of the one-way clutch 24c in the first stator 24.

The stator support member 31c includes a groove portion radially extending. Besides, the stator coil 31b is connected to an inverter 110 installed outside the torque converter 100, while being distributed in the groove portion of the stator support member 31c. It should be noted that the stator coil 31b is taken out of the torque converter 100, while extending inside the inner race of the one-way clutch 24c and the stationary shaft 103.

The rotor 32 is disposed to be rotated about the rotational axis O of the torque converter 100. The rotor 32 is unitarily rotated with the output member 4. The rotor 32 is coupled to the output member 4 through a rotor support member 32c. The rotor 32 is disposed radially outside the second stator 31. In other words, the rotary electrical machine 3 is of an outer rotor type.

The rotor 32 includes a rotor core 32a and a plurality of permanent magnets 32b. The rotor core 32a has a substantially cylindrical shape. The rotor core 32a is formed by axially laminating a plurality of electromagnetic steel plates. The rotor core 32a is disposed radially outside the stator core 31a. The rotor core 32a is disposed to be rotatable about the rotational axis O.

The permanent magnets 32b are buried into the rotor core 32a. In other words, the rotary electrical machine 3 is an IPM (Interior Permanent Magnet) motor. The permanent magnets 32b are, for instance, neodymium magnets.

The rotor 32 is coupled to the output member 4 through the rotor support member 32c. The rotor 32 is fixed to the rotor support member 32c. The rotor support member 32c supports the rotor core 32a. The rotor support member 32c has a disc shape. The rotor support member 32c radially extends. The rotor core 32a is fixed to the outer peripheral end of the rotor support member 32c.

The rotor support member 32c is attached at the inner peripheral end thereof to the output member 4. When described in detail, the rotor support member 32c is fastened at the inner peripheral end thereof to the output member 4 by at least one rivet 108.

The rotor 32 is unitarily rotated with the turbine 23. The rotor 32 is coupled to the turbine 23 through the rotor support member 32c. The rotor support member 32c is engaged with a pawl portion 23c fixed to the turbine shell 23a. Because of this, the turbine 23 is non-rotatable relative to the rotor 32 and the output member 4. In other words, the turbine 23 is unitarily rotated with the rotor 32 and the output member 4.

The rotary electrical machine 3 includes an angle-of-rotation sensor 33. The angle-of-rotation sensor 33 is configured to detect the angle of rotation of the rotor 32. The angle-of-rotation sensor 33 is attached to the stator support member 31c. In the present preferred embodiment, the angle-of-rotation sensor 33 detects the angle of rotation of the output member 4 unitarily rotated with the rotor 32, whereby the angle of rotation of the rotor 32 is indirectly detected.

[Output Member]

The output member 4 is disposed to be rotatable about the rotational axis O. The output member 4 is configured to be unitarily rotated with the input shaft 104. When described in detail, the output member 4 has a cylindrical shape and is provided with spline grooves on the inner peripheral surface thereof. Then, the input shaft 104 is spline-coupled to the output member 4.

The output member 4 includes a flange portion 41 radially extending. The rotor support member 32c is fixed to the flange portion 41. Because of this, the output member 4 receives a torque transmitted from the rotor 32 and the turbine 23. Then, the output member 4 transmits the torque to the input shaft 104.

[Lock-Up Piston]

The lock-up piston 5 is disposed to be axially movable. The lock-up piston 5 is disposed axially between the cover 21 and the rotary electrical machine 3. The lock-up piston 5 has a disc shape. The lock-up piston 5 is axially slid on the output member 4. Besides, the lock-up piston 5 is rotatable relative to the output member 4 within a predetermined range of angle.

The lock-up piston 5 allows or blocks transmitting a torque thereto from the cover 21. The lock-up piston 5 includes a clutch mechanism. In the present preferred embodiment, the lock-up piston 5 includes a friction facing 51 as the clutch mechanism. The friction facing 51 is disposed on the outer peripheral end of the lock-up piston 5. The friction facing 51 is opposed to the cover 21.

When the lock-up piston 5 is moved toward the cover 21, the friction facing 51 is engaged by friction with the cover 21. Accordingly, a lock-up on state is made. By contrast, when the lock-up piston 5 is moved away from the cover 21, the friction facing 51 is released from being engaged by friction with the cover 21. Accordingly, a lock-up off state is made.

[Damper Mechanism]

The damper mechanism 6 elastically connects the lock-up piston 5 and the output member 4. The damper mechanism 6 is disposed radially inside the rotary electrical machine 3. When described in detail, the damper mechanism 6 is disposed radially inside the stator core 31a and the rotor core 32a. As seen in a radial view, the damper mechanism 6 overlaps the rotary electrical machine 3.

The damper mechanism 6 includes a first engaging member 61, a second engaging member 62, and a plurality of springs 63.

The first engaging member 61 is fixed to the lock-up piston 5. When described in detail, the first engaging member 61 is fastened to the lock-up piston 5 by at least one rivet 109.

The second engaging member 62 is fixed to the output member 4. When described in detail, the second engaging member 62 is fastened together with the rotor support member 32c to the output member 4 by the at least one rivet 108.

The plural springs 63 are disposed at intervals in the circumferential direction. The springs 63 are disposed circumferentially between the first engaging member 61 and the second engaging member 62. The springs 63 transmit a torque from the first engaging member 61 to the second engaging member 62 therethrough. The springs 63 are, for instance, coil springs.

[Other Configurations]

The inverter 110, a battery 111, and so forth are connected to the torque converter 100.

The inverter 110 is electrically connected to the stator coil 31b of the second stator 31. When the rotary electrical machine 3 functions as a generator, the inverter 110 converts alternating current, generated in the second stator 31, into direct current. The battery 111, electrically connected to the inverter 110, is then charged with the electric current transmitted thereto from the inverter 110. By contrast, when the rotary electrical machine 3 functions as a motor, the inverter 110 converts direct current, fed thereto from the battery 111, into alternating current and supplies the alternating current to the second stator 31.

[Hydraulic Oil Pathways]

The torque converter 100 includes a first oil pathway P1 and a second oil pathway P2. The first oil pathway P1 is defined by a space produced inside the input shaft 104. The first oil pathway P1 communicates with a space produced between the cover 21 and the lock-up piston 5.

The second oil pathway P2 is defined by a space produced between the impeller hub 22c and the stationary shaft 103. The second oil pathway P2 communicates with a space produced between the impeller 22 and the turbine 23.

When the hydraulic oil is supplied to the interior of the torque converter 100 through the first oil pathway P1, the lock-up clutch is turned off. Then, the hydraulic oil is supplied through in-between of the cover 21 and the lock-up piston 5, flows through in-between of the impeller 22 and the turbine 23, and is discharged through the second oil pathway P2.

Contrarily to the above, when the hydraulic oil is supplied through the second oil pathway P2, the lock-up clutch is turned on. Then, the hydraulic oil flows through at least one oil hole provided in the inner peripheral part of the lock-up piston 5 and is discharged through the first oil pathway P1.

With the hydraulic oil supplied to the interior of the torque converter body 2 as described above, cooling of the rotary electrical machine 3 is enabled.

[Actions of Torque Converter]

For example, the torque converter 100 configured as described above operates as follows.

When the lock-up piston 5 is not being engaged with the cover 21, i.e., when the lock-up off state is made, a torque outputted from the drive source (e.g., engine) is transmitted to the cover 21 and the impeller 22. Then, the torque is transmitted from the impeller 22 to the turbine 23 through the hydraulic oil and is then transmitted to the output member 4 through the rotor support member 32c.

When the lock-up piston 5 is being engaged with the cover 21, i.e., when the lock-up on state is made, a torque outputted from the drive source (e.g., engine) is transmitted from the cover 21 to the lock-up piston 5. The torque is then transmitted from the lock-up piston 5 to the output member 4 through the damper mechanism 6.

When the rotary electrical machine 3 is being driven, a torque outputted from the rotor 32 of the rotary electrical machine 3 is transmitted to the output member 4 through the rotor support member 32c.

[Modifications]

One preferred embodiment of the present invention has been explained above. However, the present invention is not limited to the above, and a variety of changes can be made without departing from the gist of the present invention.

Modification 1

Figure 3:
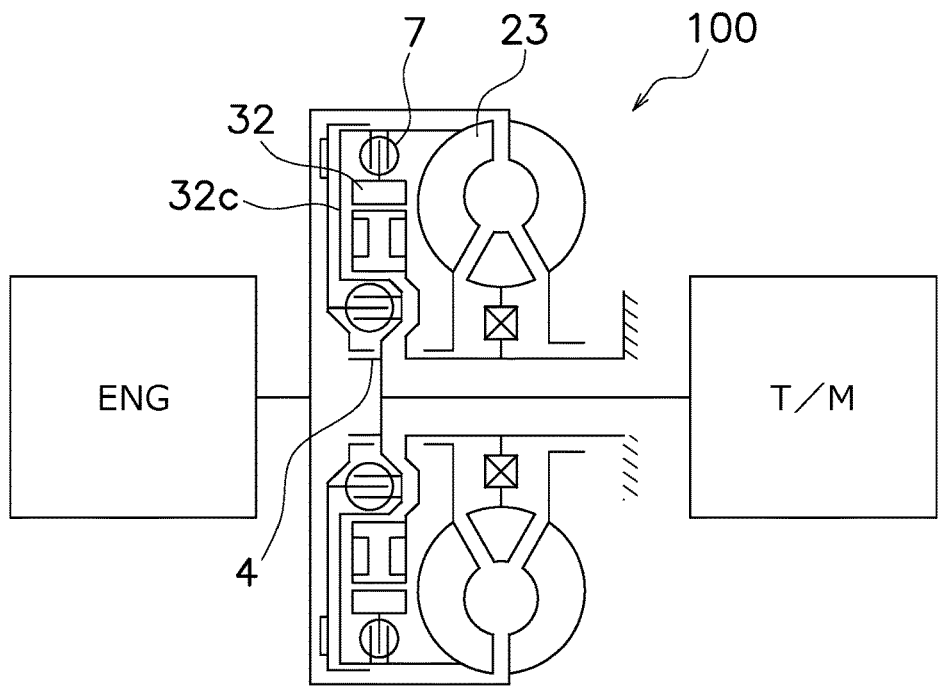
FIG. 3 is a schematic diagram of a torque converter according to a modification.

As shown in FIG. 3, the torque converter 100 can further include at least one elastic member 7. The at least one elastic member 7 elastically couples the rotor 32 and the output member 4. In other words, the rotor 32 is coupled to the output member 4 through the at least one elastic member 7. When described in detail, the rotor 32 is attached to the rotor support member 32c through the at least one elastic member 7. It should be noted that the turbine 23 is coupled to the output member 4 without through the at least one elastic member 7.

According to this configuration, when the rotary electrical machine 3 is not rotated and driven, the rotor 32 and the at least one elastic member 7 are enabled to function as a dynamic vibration absorber. In other words, the rotor 32 is enabled to function as an inertia member of the dynamic vibration absorber. It should be noted that the at least one elastic member 7 is, for instance, at least one coil spring.

Figure 4:
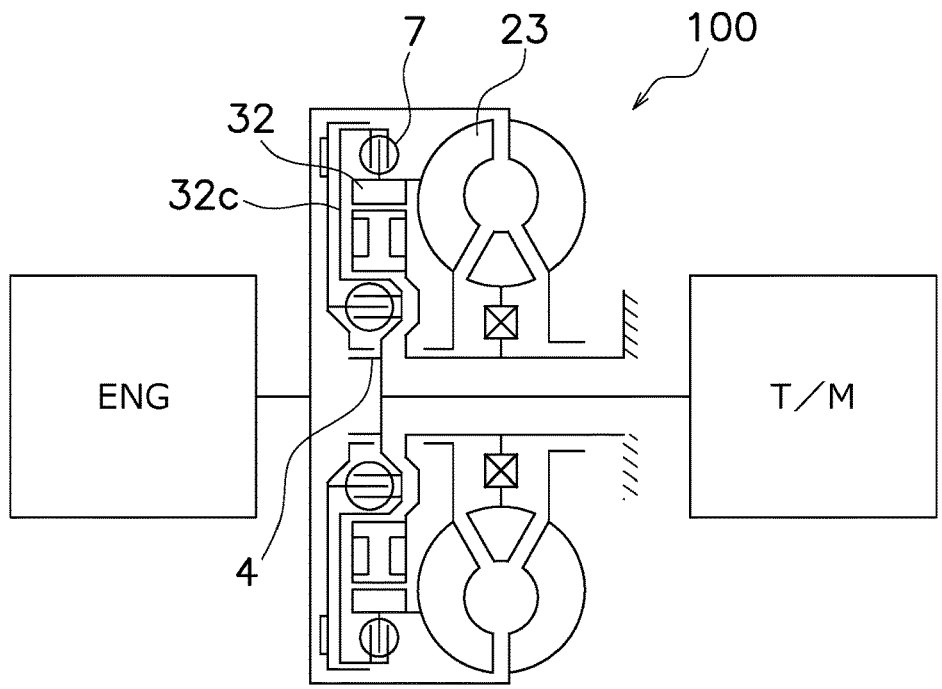
FIG. 4 is a schematic diagram of a torque converter according to the modification.

It should be noted that as shown in FIG. 4, the at least one elastic member 7 can elastically couple not only the rotor 32 and the output member 4 to each other but also the turbine 23 and the output member 4 to each other. In other words, not only the rotor 32 but also the turbine 23 can be coupled to the output member 4 through the at least one elastic member 7. According to this configuration, not only the rotor 32 but also the turbine 23 is enabled to function as the inertia member of the dynamic vibration absorber.

Modification 2

Figure 5:
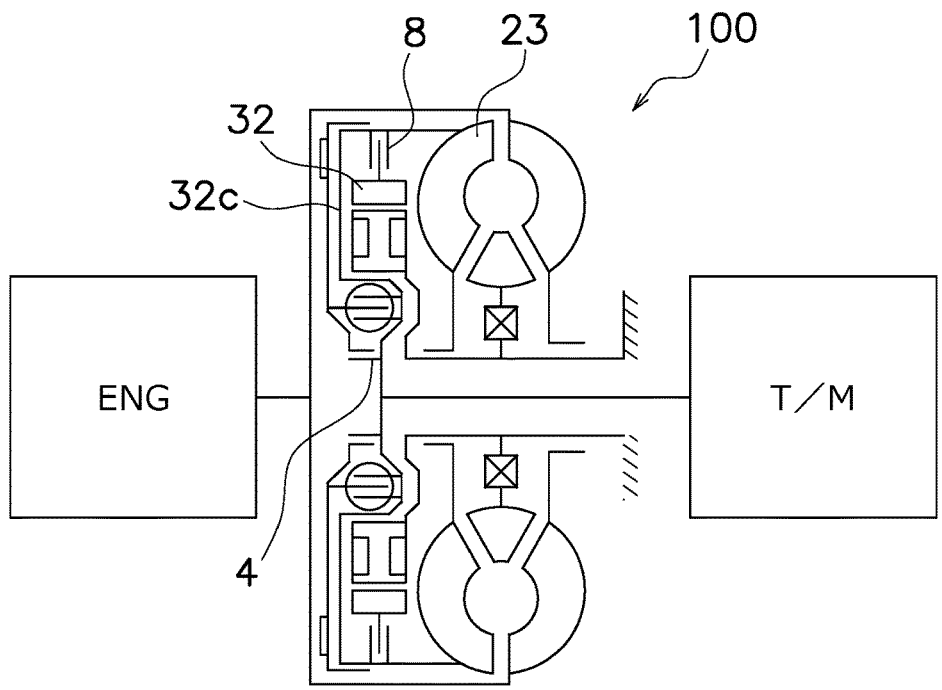
FIG. 5 is a schematic diagram of a torque converter according to another modification.

As shown in FIG. 5, the torque converter 100 can include a clutch part 8. The clutch part 8 is configured to allow or block transmitting a torque between the rotor 32 and the output member 4. Specifically, the rotor 32 is attached to the rotor support member 32c through the clutch part 8. According to this configuration, when the rotary electrical machine 3 is not used, the rotor 32 can be disconnected from the output member 4 by turning the clutch part 8 to a clutch-off state. As a result, the rotor 32 can be prevented from rotating together with the output member 4. Hence, the rotary electrical machine 3 can be prevented from generating a back electromotive force.

Modification 3

Figure 6:
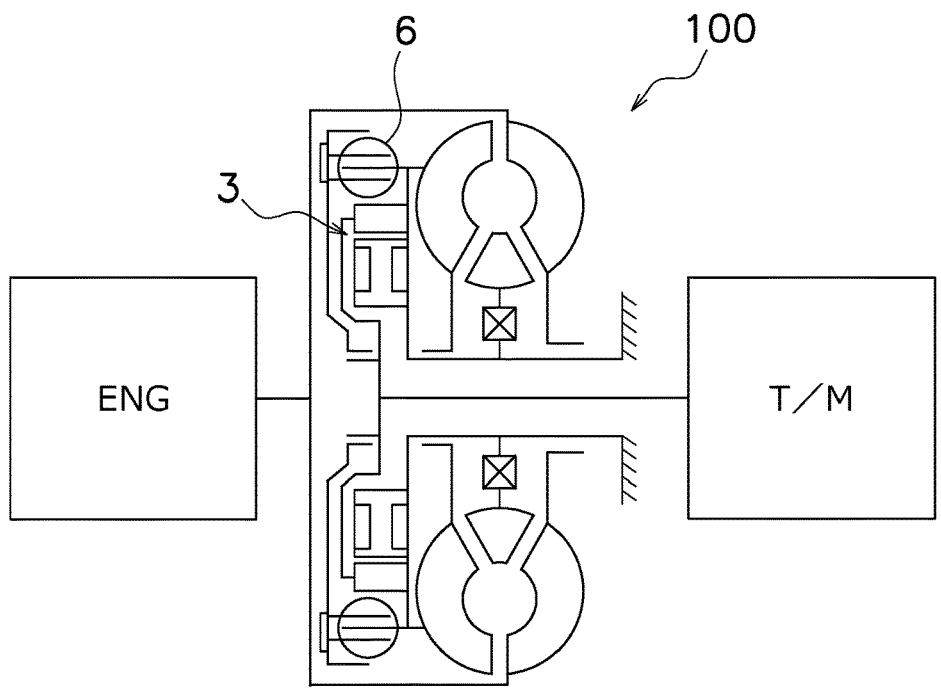
FIG. 6 is a schematic diagram of a torque converter according to yet another modification.

As shown in FIG. 6, the damper mechanism 6 can be disposed radially outside the rotary electrical machine 3. According to this configuration, the damper mechanism 6 can be enhanced in attenuation performance.

Modification 4

Figure 7:
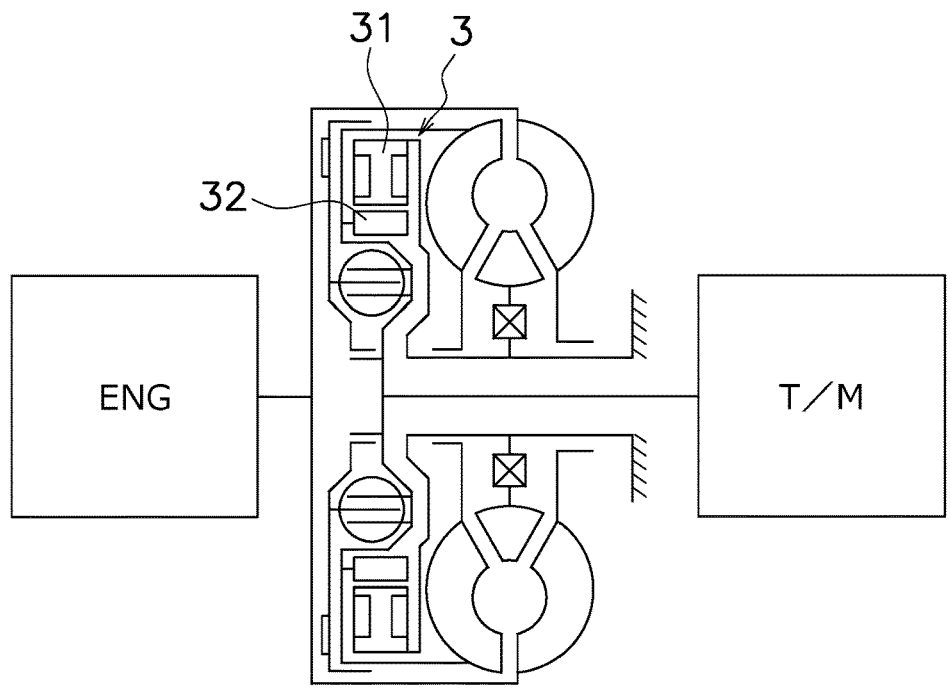
FIG. 7 is a schematic diagram of a torque converter according to still another modification.

As shown in FIG. 7, the rotary electrical machine 3 can be of an inner rotor type. In other words, the rotor 32 can be disposed radially inside the second stator 31.

Modification 5

In the torque converter 100 according to the preferred embodiment described above, a torque outputted from the drive source (e.g., engine) is transmitted to the cover 21 and is then transmitted from the output member 4 to the input shaft 104 of the transmission. However, the torque transmission path in the torque converter 100 is not limited to this.

Figure 8:
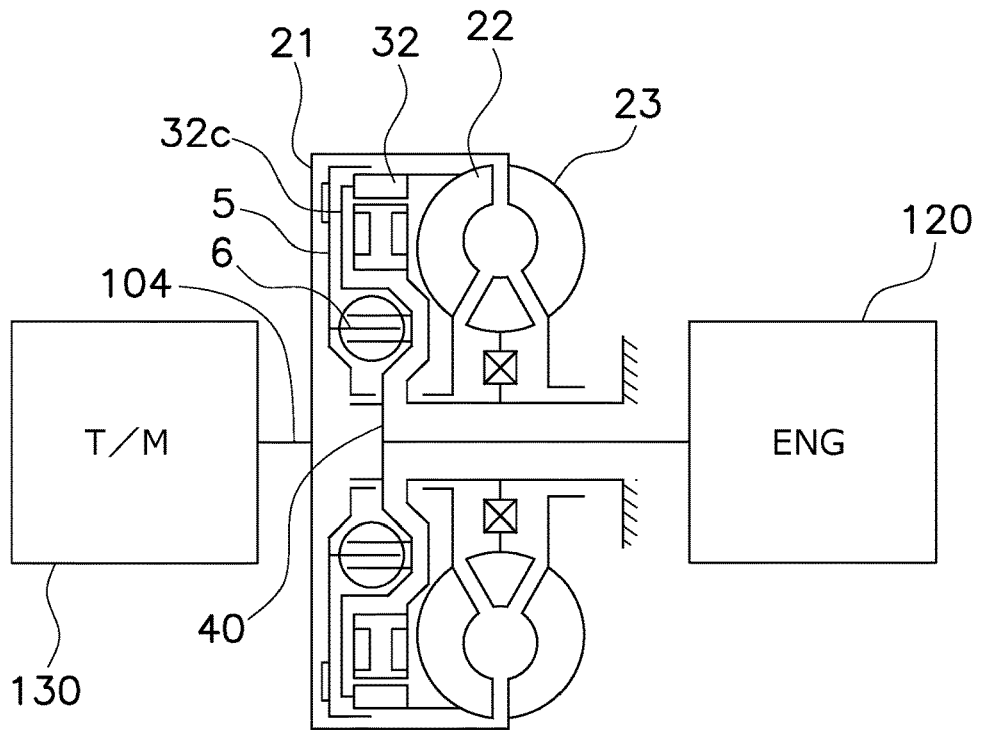
FIG. 8 is a schematic diagram of a torque converter according to still yet another modification.

For example, as shown in FIG. 8, a torque outputted from the drive source (e.g., the engine 120) can be transmitted to an input member 40 and is then transmitted from the cover 21 to the input shaft 104 of the transmission 130. In this case, the impeller 22 and the turbine 23 are switched in position compared to the preferred embodiment described above. Specifically, the turbine 23 is fixed to the cover 21. The cover 21 and the turbine 23 compose an outer shell of the torque converter body 2. The impeller 22 is disposed axially between the cover 21 and the turbine 23. When described in detail, the impeller 22 is disposed between the turbine 23 and the rotary electrical machine 3.

The input member 40 transmits a torque, inputted thereto from the drive source (e.g., the engine 120), to the impeller 22. When described in detail, the input member 40 transmits the torque to the impeller 22 through the rotor support member 32c. Besides, when the lock-up piston 5 is in the lock-up on state, the input member 40 transmits the torque to the lock-up piston 5 through the damper mechanism 6. The torque transmitted to the cover 21 is transmitted to the input shaft 104 of the transmission 130. It should be noted that the input member 40 has the same configuration as the output member 4 in the preferred embodiment described above.

Modification 6

The rotor support member 32c can be a part of the output member 4. In other words, the rotor support member 32c can compose a single member together with the output member 4.

Modification 7

In the preferred embodiment described above, the rotary electrical machine 3 is an IPM motor, but alternatively, can be an SPM (Surface Permanent Magnet) motor. In other words, the permanent magnets 32b can be fixed onto the surface of the rotor core 32a.

REFERENCE SIGNS LIST

2 Torque converter body
21 Cover
22 Impeller
23 Turbine
24 First stator
3 Rotary electrical machine
31 Second stator
32 Rotor
4 Output member
40 Input member
5 Lock-up piston
6 Damper mechanism
7 Elastic member
100 Torque converter

What is claimed is:

1. A torque converter, comprising:
   a torque converter body including a torque converter cover, an impeller, a turbine, and a first stator, 1) the torque converter cover and the impeller or 2) the torque converter cover and the turbine together forming an internal chamber within the torque converter body with torque-converter hydraulic oil contained therein; and a rotary electrical machine including a rotor and a second stator, the rotary electrical machine disposed inside the internal chamber in the torque converter body.

2. The torque converter according to claim 1, wherein the first stator and the second stator are supported by a stationary shaft.

3. The torque converter according to claim 1, wherein, of the impeller and the turbine, the impeller forms the internal chamber together with the torque converter cover and the rotor and the second stator are disposed between the torque converter cover and the turbine.

4. The torque converter according to claim 1, further comprising:

an output member configured to output a torque transmitted thereto from the turbine and the rotor.

5. The torque converter according to claim 4, wherein the rotor is unitarily rotated with the output member.

6. The torque converter according to claim 4, further comprising an elastic member configured to elastically couple the output member and at least one of the rotor and the turbine.

7. The torque converter according to claim 4, further comprising a clutch part configured to allow and block transmission of the torque between the rotor and the output member.

8. The torque converter according to claim 4, wherein the turbine is non-rotatable relative to the output member or the rotor.

9. The torque converter according to claim 4, further comprising a lock-up piston disposed to be axially movable.

10. The torque converter according to claim 9, further comprising a damper mechanism configured to elastically connect the lock-up piston and the output member.

11. The torque converter according to claim 10, wherein the damper mechanism is disposed radially inside the rotary electrical machine.

12. The torque converter according to claim 1, wherein the rotor is disposed radially outside the second stator.

13. The torque converter according to claim 1, wherein the second stator is attached to the first stator.

14. The torque converter according to claim 1, further comprising an input member configured to transmit a torque outputted from a drive source to the impeller, wherein the torque converter cover outputs the torque to a drive wheel, of the turbine and the impeller, the turbine is fixed to the torque converter cover to form the internal chamber within the torque converter body, and the impeller is disposed axially between the torque converter cover and the turbine.

15. The torque converter according to claim 1, wherein the torque converter cover partially delimits a pathway through which the torque-converter hydraulic oil flows, the rotary electrical machine being disposed inside the internal chamber in position to be contacted by the torque-converter hydraulic oil as the torque-converter hydraulic oil flows along the pathway.

* * * * *